United States Patent [19]

Kehl

[11] 4,270,758
[45] Jun. 2, 1981

[54] LEVER OPERATED STYLUS GUARD FOR PHONOGRAPH PICK-UP CARTRIDGE

[75] Inventor: Joseph D. Kehl, Chicago, Ill.

[73] Assignee: Shure Brothers, Inc., Evanston, Ill.

[21] Appl. No.: 100,420

[22] Filed: Dec. 5, 1979

[51] Int. Cl.³ .......................... G11B 21/00; G11B 3/10
[52] U.S. Cl. ..................................... 369/170; 369/256
[58] Field of Search ................. 274/1 R, 23 R, 24, 25, 274/37

[56] References Cited

U.S. PATENT DOCUMENTS

| 235,070 | 5/1875 | Deschamps et al. | D26/14 D |
|---|---|---|---|
| 235,351 | 6/1875 | Deschamps | D26/14 D |
| 830,689 | 9/1906 | Valiquet | 274/25 |
| 1,249,720 | 12/1917 | Christian | 274/25 |
| 1,428,828 | 12/1922 | Ahearn | 274/25 |
| 2,214,509 | 9/1940 | Otto | 274/25 |
| 2,262,503 | 11/1941 | Kierulff | 274/25 |
| 2,327,094 | 8/1943 | Catucci | 274/25 |
| 2,417,814 | 3/1947 | Dale | 274/23 R |
| 2,418,617 | 4/1947 | Bessire | 274/25 |
| 3,085,806 | 4/1963 | Sariti et al. | 274/37 |
| 4,165,078 | 8/1979 | Kuehn | 274/1 R |
| 4,194,744 | 3/1980 | Groh | 274/37 |
| 4,198,056 | 4/1980 | Cooper | 274/1 R |

FOREIGN PATENT DOCUMENTS 1002135  2/1957  Fed. Rep. of Germany ........ 274/23 R Primary Examiner—John W. Shepperd
Attorney, Agent, or Firm—Allegretti, Newitt, Witcoff & McAndrews

[57] ABSTRACT

A stylus guard assembly for use with a phonograph pick-up cartridge, which assembly includes a cam member, a manually operated lever with a pivot operating arm and walls providing detent surfaces. The pivot operating arm is disposed at an angle to a lever which engages a curved cam slot on a stylus guard. When the lever is manually displaced through its designated travel, the movement at the end of the arm, through the action of the cam mechanism, causes the guard to rotate on its pivot from one position to another. In one position, the guard is retracted to expose the stylus. In both positions, the guard is held in place by the detent mechanism. The manually operated lever produces a visual indication of the stylus guard position, which shows whether the stylus guard is in the position to allow the stylus tip to engage with the recording or is in the position to protect the stylus when not in use.

10 Claims, 7 Drawing Figures

LEVER OPERATED STYLUS GUARD FOR PHONOGRAPH PICK-UP CARTRIDGE

BACKGROUND OF THE INVENTION

1. FIELD OF THE INVENTION

Stylus guards for phonograph cartridges have been provided heretofore, but they have not provided for manual operation to lock into an operative or inoperative position with a conveniently located manually operated lever which also indicates the position of the stylus guard and provides reference to the location of the stylus tip. Sound reproducing apparatus for use with phonograph records generally include an electromechanical transducer cartridge to which is attached a stylus for transmitting sound signals from the record by means of a stylus tip which contacts the groove of a phonograph record. The stylus tip then transmits vibrations from the record groove through the stylus and to the electromechanical transducer which transmits the vibrations into electrical energy which is in turn converted to sound. Since the stylus tip may wear out, or be broken, it is a general practice to provide the stylus with a stylus holder or grip which may be readily inserted into and removed from the pick-up cartridge. It is also desirable to provide means to protect the stylus tip from damage due to accidental dropping or mishandling when not in use.

It is an objective of the invention to provide a moveable stylus guard for a phonograph cartridge which includes a manually operable lever which moves the guard to a position wherein it protects the stylus and also to a withdrawn position wherein the stylus may contact the recording to which it is intended to engage. It is a further objective to locate the lever so that it will serve as an indicator of the position of the stylus guard and act as a cueing guide when the stylus guard is in the withdrawn position and in position to allow the stylus to "play" the phonograph record.

It is also an objective of the invention to provide a moveable stylus guard for a phonograph cartridge that is self-locking in the guarded and unguarded positions of the stylus guard, as compared to a stylus guard that merely snaps in place due to a detent arrangement.

It is also an objective of the invention to provide a movable stylus guard for a phonograph cartridge which is formed of a number of parts which may be snapped together for assembly, and which requires minimal or no fastening means such as bolts, nuts, or rivets, and, therefore, is a conveniently assembled structure.

It is a further objective of the invention to provide a pivoted stylus guard for a phonograph cartridge which is formed mainly of thermoplastic parts which may be inexpensively formed and assembled.

It is an additional objective of the invention to provide a moveable stylus guard for a phonograph cartridge which, when placed in the position to guard the stylus, will not cause injury to the recording with which the stylus is to be used if it comes into contact therewith.

DESCRIPTION OF PRIOR ART

Stylus guards for phonograph pick-up cartridges have been previously used and described. U.S. Pat. Nos.:

| 830,689 | L. P. Valiquet | September 11, 1906 |
| 1,249,720 | E. L. Christian | December 11, 1917 |
| 1,428,828 | T. Ahearn | September 12, 1922 |
| 2,214,509 | E. Otto | September 10, 1940 |
| 2,262,503 | W. E. Kierulff | November 11, 1941 |
| 2,327,094 | P. Catucci | August 17, 1943 |
| 2,417,814 | C. B. Dale | March 25, 1947 |
| 2,418,617 | J. J. Bessire | April 8, 1947 | show stylus protective means, however, none of these include all of the details and advantages of the described device.

A moveable stylus guard is shown and described in design U.S. Pat. Nos.:

| 235,070 | R. L. Deschamps, et al |
| 235,351 | R. L. Deschamps | both assigned to Shure Brothers Incorporated, the assignee of the present application.

Also, an example of a prior art stylus guard attached to a phonograph pick-up cartridge is shown and described in now U.S. Pat. No. 4,194,744 of Allen R. Groh Feb. 1, 1978 and assigned to Shure Brothers, Inc., the assignee of the present application.

SUMMARY OF THE INVENTION

The invention is for a stylus guard assembly for phonograph cartridges which is provided with a manually operated stylus operating lever which provides a visual indication of the stylus guard position.

DESCRIPTION OF THE PREFERRED EMBODIMENT

Figure 2:
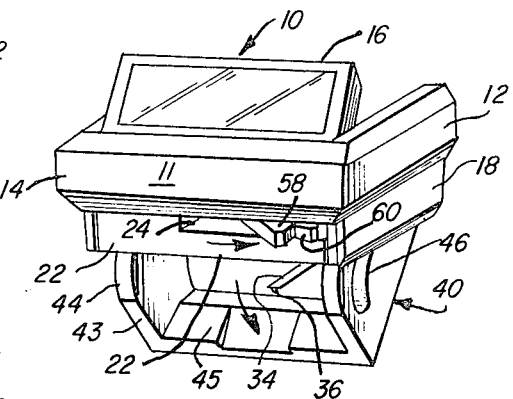
FIG. 2 is a perspective view similar to FIG. 1 with the stylus guard in the downwardly extended position, wherein the stylus is protected and will not contact the recording.
Figure 3:
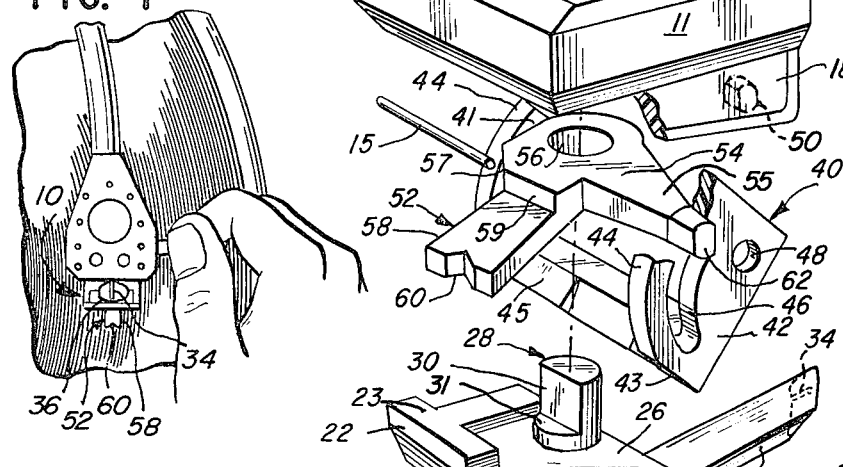
FIG. 3 is an exploded perspective view of the parts of the stylus guard shown in FIGS. 1 and 2.

Referring specifically to the drawing for a detailed description of the invention, as best shown in FIG. 3, numeral 10 designates a stylus assembly which is formed of four main portions, namely; a finger grip 11, a stylus housing assembly 20, a stylus guard 40, and a lever member 52. These parts are preferably formed of thermoplastic material such as polycarbonate or acrylonitrile butadiene styrene and portions thereof have sufficient resiliency to afford assembly and retention of the various parts of the device without the use of fasteners, such as nuts, screws, or rivets. In addition, a spring 15, also shown in FIG. 3, preferably formed of stainless steel spring material or the like, and is provided to maintain the lever member 52 in either of its two locking positions, stylus guarded (FIG. 2) or stylus unguarded (FIG. 1), as shown by the operator.

The finger grip 11 is a U-shaped member which includes side walls 12 and a connecting end wall 14 of relatively heavy thermoplastic molded material with a downwardly extending parallel skirt portion 18 formed integrally with the side walls 12. Also provided is a member 16 which is formed integrally with the connecting end wall 14, and is primarily for decorative purposes, and may carry the name of the manufacturer thereon, if desired.

Figure 4:
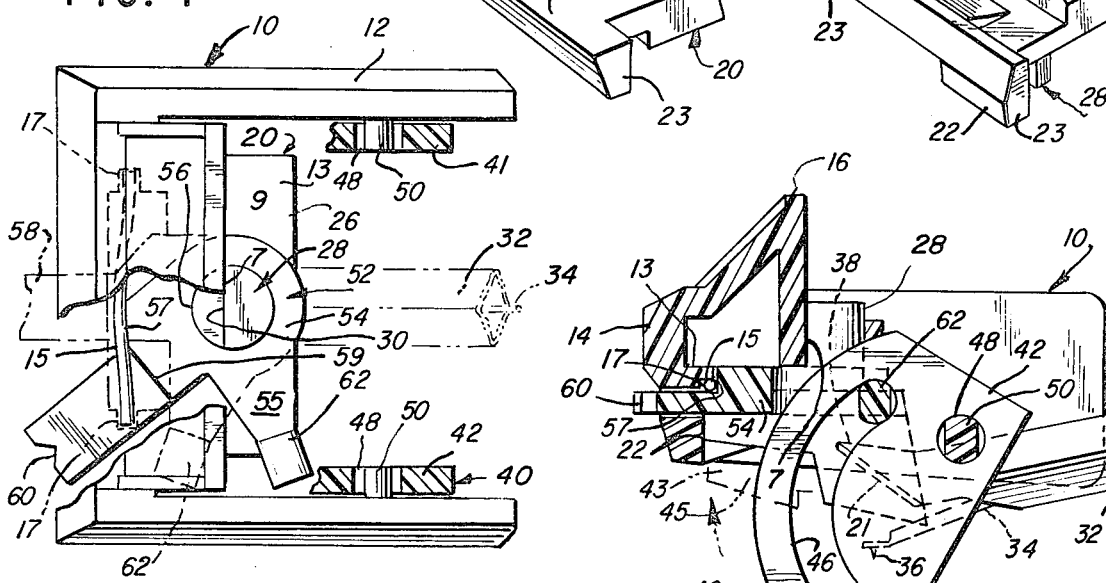
FIG. 4 is a top view, partially in section, of the stylus guard shown in FIGS. 1, 2 and 3.
Figure 5:
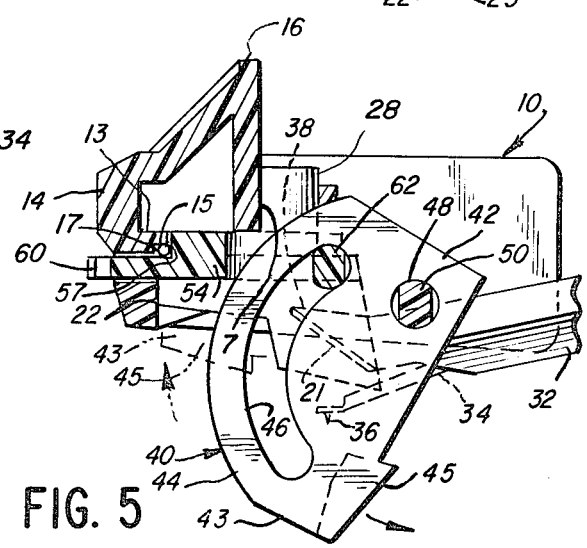
FIG. 5 is a horizontal partial sectional view of the stylus guard shown in FIG. 4.

The stylus housing assembly 20, as best shown in FIG. 3, comprises a main body portion 26, which has a flat upper surface from which a cylindrical protrusion 28 extends. This protrusion is provided with a flat portion 30 of the upper end thereof to facilitate the insertion into aperture 9 in supporting wall 13, as best shown in FIG. 4. This allows aperture 56 in lever member 52 50 fit snugly around protrusion 28, but permits rotational movement of lever member 52 about an axis through aperture 56.

Figure 1:
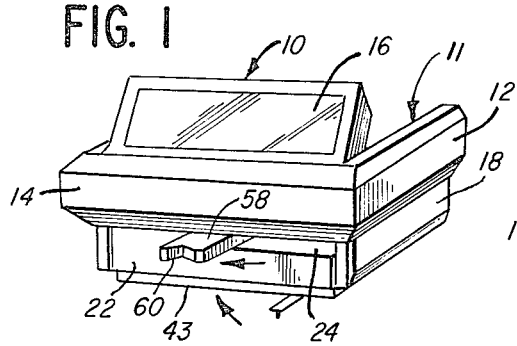
FIG. 1 is a perspective front view of the stylus guard with the guard in its position wherein the stylus is allowed to engage with a recording.

The stylus housing assembly 20 includes a substantially vertical front wall portion 22, which has extremities 23 extending form each end thereof, that seat on the finger grip 11, as best shown in FIG. 1.

Figure 7:
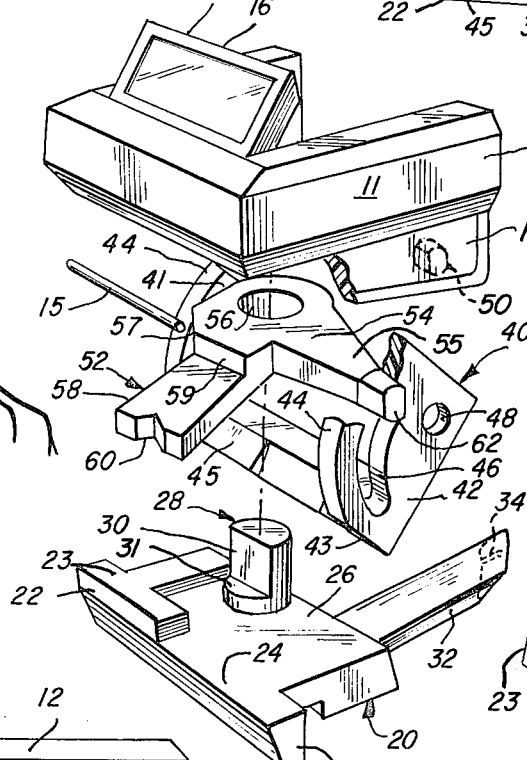
FIG. 7 is a top view, partially in section, of the complete phonograph cartridge, mounted in a tone arm and being cued an operator.
Figure 6:
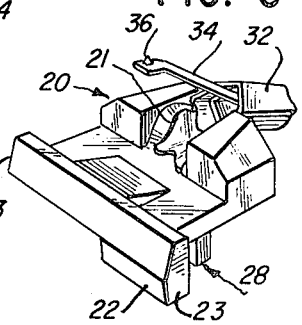
FIG. 6 is a bottom plan view of the underside of the stylus guard retaining member shown at the bottom of FIG. 3.

The stylus housing assembly 20, as best shown in FIG. 6, also includes a recess 21 on the underside, which receives metal sleeve 32 for stylus 34. one end of the stylus is provided with a tip 36, generally fashioned from diamond material to engage the grooves in a recording (FIG. 7). A part of the stylus housing assembly 20 is molded around one end of the metal sleeve 32, and is thus secured thereto in a relatively permanent manner. The other end of the stylus 34, extending out of the metal sleeve 32, is connected to, or is in contact with the electromechanical transducer of the phonograph cartridge (FIG. 7). No details are given on the electromechanical transducer of the phoongraph since the cartridge does not form a part of the present invention, and is fully described and illustrated in the aforesaid Groh, et al, application Ser. No. 874,054.

The finger grip 11 provides for pivotally engaging and positioning the stylus guard 40 through the operation of pivot pins 50 and apertures 48. Stylus guard 40 comprises a pair of slightly flexible end walls 41 and 42, connected by a cross piece 45, as best shown in FIG. 2. The edges of the end walls 41 and 42 are contoured as shown at 44, and also have flat surfaces 43, to permit that portion of stylus guard 40 to retract between the parallel skirt portions 18 when the stylus guard 40 is in the raised position shown in FIG. 1. In the raised position, the stylus tip 36 is unobstructed and able to engage the grooves in the recording.

A curved slot 46 is provided in the end wall 42 which accepts pivot pin 62 to effect rotational movement thereof. The lever member 52 includes a flat body portion 54, having a circular opening 56 therein, which is adapted to slide over and pivot about the cylindrical bottom 31 of protrusion 28. The lever member 52 includes an arm 58 extending from the body portion 54 which is provided with a notch 60 at its forward end so that it is readily engageable by the finger of the operator, and can assist in the cueing of the stylus to the recording disc by its use by a direct reference point to the location of the stylus tip 36, when the stylus guard is in the unengaged position, as best shown in FIG. 7. The relation between notch 60 and stylus tip 36 is achieved since the stylus 34 is mounted directly in line with notch 60 when the stylus guard 40 is in the inoperative position and the stylus tip 36 is unprotected. As best shown in FIG. 3, a vertical flat wall 57 is provided at an angle to the flat wall 59. A second arm 55 extends from body portion 54 at an angle to arm 58 and is provided with a pivot 62 which slides into slot 46 of end wall 42 of the stylus guard 40 to effect rotational movement thereof.

The side walls 12 of finger grip 11 are provided with pivot pins 50 formed integrally with the walls 12. The apertures 48 of the stylus guard 40 provide a pivot for the stylus guard 40 about the pivot pin 50, as best shown in FIG. 3.

Spring 15 is retained in slots 17, as best shown in FIG. 4. Slots 17 are provided in the ends of supporting wall 13, which is formed in finger grip 11. In the stylus guarded position spring 15 provides tension against flat wall 57 which causes lever member 52 to be maintained in its position, hence stylus guard 40 is immobilized and will protect the stylus 34 even if the stylus assembly is dropped. In the stylus unguarded position, spring 15 provides tension against a flat wall 59 which causes lever member 52 to be maintained in its position, hence arm 58 is retained in alignment with the stylus 34, thereby allowing notch 60 to act as an accurate reference to the location of the stylus tip 36.

The five parts of the device are assembled together without the use of any screws, rivets, nuts, or bolts, but are snapped or pressed into position allowing for a minimum of assembly time. This is possible because of the resiliency of the plastic material utilized, since fairly thin sections of plastic are provided at appropriate parts of the device which are flexible to facilitate assembly. Also the housing assembly 20 is held in position with respect to stylus assembly 10 because of the tight fit on protrusion 28 which may then be staked to insure permanency.

After the molded thermoplastic parts of the device have been completed and the spring 15 has been provided, the parts are assembled in the following manner.

Spring wire 15 is positioned in slots 17 so that it will contact the flat vertical walls 57 and 59 of the lever member 52, depending upon the position thereof. Spring wire 15 is then cemented at both ends in slots 17 to insure permanency. The apertures 48 of stylus guard 40 are placed over pivot pins 50. Stylus guard 40 is then positioned. The lever member 52 has projection 62 inserted in slot 46 in wall 42 and retained therein while the housing assembly 20 is secured to the stylus guard assembly 10, with the protrusion 28 extending through the aperture 56 in lever member 52. The flat portion 30 of protrusion 28 is frictionally engaged by a flat portion 7 of an aperture 9 in supporting wall 13 of the stylus grip 11. The protrusion 28 is inserted through the aperture 56 of lever member 52 after it has been properly positioned and the upper flat portion 30 of the protrusion 28 is further inserted into an aperture 9 in supporting wall 13 and the parts are frictionally therein held together. The assembly is thus completed.

When the arm 58 of lever member 52 is moved into the position shown in FIG. 1, pivot pin 62 on the lever member 52 engages with the curved slot 46 in the stylus guard 40 and the stylus guard 40 is moved to its upward position, with the tip 36 of the stylus 34 in the position to engage a recording. The stylus guard 40 is rotated downwardly by the movement of the lever member 52 which causes the pivot pin 62 to rotate the guard member downwardly by engaging with the curved slot 46, thus moving the stylus guard 40 to the position shown in FIG. 2, where the stylus tip 36 is protected and cannot contact the recording. The stylus guard 40, when in the stylus guarded position, also protects the recording from damage caused by the tip 36 due to dropping or mishandling of the stylus arm in such a manner as to cause the tip to damage the record groove.

From the foregoing, it will be apparent that an improved lever operated stylus guard for phonograph pick-up cartridges has been provided. It is formed of a number of easily molded plastic parts which may be assembled together without the use of any fastening means, such as screws, nuts or rivets, and which provides for moving the stylus guard to a position where the stylus is protected and cannot contact the record to be played, and also for moving it to the position where the stylus may contact the record. The movement is by a manual lever which also serves the functions of indicating the position of the stylus guard and is a direct reference to the location of the stylus tip, therefore enabling it to function as a cueing guide. This function occurs since the stylus is mounted in line with the manual lever when the manual lever is located so that the stylus guard is in position to allow the stylus to engage the grooves of the recording.

As stated, the parts are formed of thermoplastic molded material, with the exception of the metal spring member, which are easy to mold and are readily assembled. It is contemplated that if a new stylus tip is necessary to replace the one being used, that the stylus assembly 10 is removed from the cartridge and a new stylus guard assembly substituted. The improved stylus guard is inexpensive and is functionally an improvement over previous stylus guard in the art.

Various modifications may be made in the form of the invention without departing from the principles disclosed in the foregoing. It is my intention therefore, that the accompanying claims be construed as broadly as possible consistent with the prior art.

I claim as my invention:

1. A stylus holder and guard for use with sound recordings comprising
    a main body member,
    a movable stylus guard member mounted on a main body member for pivotal movement in a first plane,
    a stylus,
    a stylus grip member to retain the stylus in a position to
    engage with a recording, also attached to said main body
    member,
    a manually rotatable lever member secured to the main body member for pivotal movement in a second plane perpendicular to the first plane, and
    means on said rotatable lever member and said movable stylus guard member to cause movement of the guard member to one position wherein the stylus cannot contact the recording and into another postion wherein the stylus is in a position to be able to contact the recording.

2. A stylus holder and guard as claimed in claim 1 wherein the means for effecting movement of the stylus guard member includes pivotal means affording rotation thereof from said one position to the other position.

3. A stylus holder and guard as claimed in claim 2 wherein detent means are provided for engaging the lever operated member to resist movement thereof from one position to another.

4. A stylus holder and guard as claimed in claim 1 or 2 wherein the lever member is positioned so that it indicates to the user whether the stylus guard member is in the non-contacting stylus position or is in the position to permit the stylus to contact the recording.

5. A stylus holder and guard as claimed in claim 1 or 2 wherein at least some of the parts are formed of slightly deformable molded plastic material.

6. A stylus holder and guard as claimed in claim 5 wherein the main body member, the movable stylus guard member, the stylus grip member and the manually rotatable lever member are assembled together without the use of fastening means by utilization of the deformability of some of the parts.

7. A stylus holder and guard as claimed in claim 1 wherein spring detent means are provided for resisting movement of the stylus guard member from one position to the other.

8. A stylus holder and guard for use with sound recordings comprising
    a generally channel shaped main body member including
        a pair of substantially parallel side walls,
        a connecting front wall for the side walls at substantially a right angle thereto,
        a supporting wall connecting at substantially a right angle to said front wall and having a pivot aperture therein, and
        pivot means extending inwardly from said parallel side walls,
    a moveable stylus guard member including
        a pair of spaced side walls, at least one of which has a curved slot formed therein, and
        a connecting end wall, extending between said side walls,
    a stylus grip member including
        a body portion,
        a pivot pin on said body portion,
        a pair of aligned projections, adapted to seat on said main body member and a wall member formed to provide a slot between said body portion of the grip member and the front wall of the main body member, a hollow stylus shield having openings at opposite ends thereof, p2 means for securing the stylus shield to the stylus grip, and
    a stylus including a metallic member terminating in
        a sharp record-engaging point projecting from the one end of the shield, with the other end of the stylus projecting from the opposite end of the shield,
    a manually rotatable lever member comprising
        a main body portion, having a central pivot aperture therein,
        a first arm on said manually rotatable lever member positioned to be manually operated extending through said slot between the connecting end wall of the main body member and said stylus grip member, a second arm on said manually rotatable lever and having a pivot pin positioned to engage with said curved slot in the guard member to cause movement thereof to a position to protect the stylus point or expose the stylus point upon manual movement of said lever member, and a spring positioned in the main member and adapted to engage one or the other of said flat surfaces, depending upon the position of the lever member, to provide a detent effect to resist movement of said lever member from one position to another position, said pivot pin on said stylus grip member extending through and frictionally engaging the opening in said rotatable lever member and the stylus grip member together and to provide a pivot for said manually rotatable lever member.

9. A stylus holder and guard as claimed in claim 8 wherein the position ofthe first arm of said manually rotatable lever member which extends thorugh said slot indicates the position of the moveable stylus guard member.

10. A stylus guard and holder as claimed in claim 8 wherein the main body member, the stylus guard member, the stylus grip member except for the stylus and its shield, and the manually rotatable lever member are all formed of a relatively hard molded plastic material.

* * * * *